United States Patent
Wada

(10) Patent No.: US 8,230,492 B2
(45) Date of Patent: Jul. 24, 2012

(54) NETWORK DEVICE, METHOD OF CONTROLLING THE SAME AND NETWORK SYSTEM

(75) Inventor: Katsuhiro Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1135 days.

(21) Appl. No.: 12/065,052

(22) PCT Filed: Sep. 22, 2006

(86) PCT No.: PCT/JP2006/319392
§ 371 (c)(1),
(2), (4) Date: Feb. 27, 2008

(87) PCT Pub. No.: WO2007/043353
PCT Pub. Date: Apr. 19, 2007

(65) Prior Publication Data
US 2009/0144360 A1 Jun. 4, 2009

(30) Foreign Application Priority Data
Oct. 6, 2005 (JP) ................................. 2005-294031

(51) Int. Cl.
*G06F 15/16* (2006.01)
*H04H 20/71* (2008.01)

(52) U.S. Cl. .......... 726/12; 709/203; 709/223; 709/224; 709/230; 726/11; 726/14; 713/153; 713/163; 713/323; 370/312

(58) Field of Classification Search ................. 713/163, 713/153, 323; 726/12, 11, 14; 709/203, 709/230, 235, 223, 224; 370/312
See application file for complete search history.

(56) References Cited

U.S. PATENT DOCUMENTS

| | | | |
|---|---|---|---|
| 6,360,076 B1 | 3/2002 | Segura et al. | |
| 7,316,022 B2 | 1/2008 | Nishio | |
| 7,447,757 B2* | 11/2008 | Muto | 709/223 |
| 7,739,375 B2* | 6/2010 | Hlasny | 709/224 |
| 7,895,361 B2* | 2/2011 | Nishio | 709/246 |
| 2002/0007374 A1* | 1/2002 | Marks et al. | 707/513 |
| 2002/0062366 A1 | 5/2002 | Roy | |
| 2003/0061333 A1 | 3/2003 | Dean | |

(Continued)

FOREIGN PATENT DOCUMENTS

EP 1 069 727 1/2001

(Continued)

OTHER PUBLICATIONS

Europen Search Report dated Nov. 19, 2009 issued during prosecution of related European application No. 06798440.1.

*Primary Examiner* — Philip Chea
*Assistant Examiner* — Shanto M Abedin
(74) *Attorney, Agent, or Firm* — Fitzpatrick, Cella, Harper & Scinto

(57) ABSTRACT

A method and apparatus for mitigating traffic increase due to both a proxy server and a network device transmitting response packets to a search request by multicast. The network device transmits to the proxy server information required for a client apparatus to communicate with the network device. When the proxy server is in a state where proxy-send of the information is possible, the network device restricts response to a search request by multicast from the client apparatus.

16 Claims, 13 Drawing Sheets

U.S. PATENT DOCUMENTS

| | | | | |
|---|---|---|---|---|
| 2003/0140119 | A1* | 7/2003 | Acharya et al. | 709/219 |
| 2003/0217136 | A1* | 11/2003 | Cho et al. | 709/223 |
| 2004/0128310 | A1* | 7/2004 | Zmudzinski et al. | 707/102 |
| 2004/0184427 | A1 | 9/2004 | Lynch | |
| 2005/0021737 | A1* | 1/2005 | Ellison et al. | 709/224 |
| 2005/0044430 | A1* | 2/2005 | Cheshire | 713/300 |
| 2005/0074018 | A1* | 4/2005 | Zintel et al. | 370/401 |
| 2005/0251549 | A1* | 11/2005 | Hlasny | 709/203 |
| 2006/0002320 | A1* | 1/2006 | Costa-Requena et al. | 370/312 |
| 2006/0010232 | A1* | 1/2006 | Page et al. | 709/223 |
| 2006/0098607 | A1* | 5/2006 | Zeng et al. | 370/338 |
| 2006/0101109 | A1* | 5/2006 | Nishio | 709/200 |
| 2006/0129813 | A1* | 6/2006 | Narayanan et al. | 713/168 |
| 2006/0170967 | A1* | 8/2006 | Maki et al. | 358/1.15 |
| 2006/0239190 | A1* | 10/2006 | Kumar et al. | 370/230 |
| 2006/0253720 | A1* | 11/2006 | Cheshire | 713/300 |
| 2006/0265473 | A1* | 11/2006 | Muto | 709/218 |
| 2007/0043850 | A1* | 2/2007 | Scheering | 709/224 |
| 2007/0076715 | A1* | 4/2007 | Bauer et al. | 370/390 |
| 2007/0078959 | A1* | 4/2007 | Ye | 709/223 |
| 2007/0079006 | A1* | 4/2007 | Oya | 709/245 |
| 2008/0033962 | A1* | 2/2008 | Yamamoto et al. | 707/10 |
| 2009/0040548 | A1* | 2/2009 | Nakamura | 358/1.15 |
| 2009/0059832 | A1* | 3/2009 | Jhamnani et al. | 370/312 |

FOREIGN PATENT DOCUMENTS

| | | |
|---|---|---|
| JP | 2000-312222 | 11/2000 |
| JP | 2003-006133 | 1/2003 |
| JP | 2003-511925 A | 3/2003 |
| JP | 2003-186765 | 7/2003 |
| JP | 2004-334793 | 11/2004 |
| WO | 01/26397 A1 | 4/2001 |
| WO | 2004/099961 | 11/2004 |

* cited by examiner

NETWORK DEVICE, METHOD OF CONTROLLING THE SAME AND NETWORK SYSTEM

TECHNICAL FIELD

The present invention relates, to a technology for searching a network device in a network system.

BACKGROUND ART

In recent years, network devices (e.g., printers, scanners and copying machines capable of connecting to networks) are rapidly becoming popular as network infrastructure is deployed.

In order to use a network device from a client apparatus (client PC) such as PC (Personal Computer), various settings are required. For example, it is required to install driver software for the network device into the PC. It is also required to know the IP address of the network device, the printer port, the print protocol to be used and the like and to set them to the driver software.

Recently, technologies for searching a network device or service connected to a network, such as Universal Plug and Play (UPnP) proposed by Microsoft Corporation, have been developed.

According to UPnP version 1.0, a client apparatus transmits a search packet to which a multicast address is set as the destination address of the packet. Having received the search packet, the network device returns to the client apparatus a response packet including its own address information and the like. In this way, the client apparatus can acquire setting information of the network device.

A technology for accumulating setting information about network devices in a search server in advance has also been proposed (see, Japanese Patent Laid-Open No. 2000-312222).

Of course, as described above, transmitting a search packet as a multicast packet facilitates searching for a network device. However, when the number of the clients or the network devices is increased, search and response packets may cause network congestion. In addition, process load for the clients and the network devices will also be increased.

On the other hand, if a proxy server for transmitting the response packet is provided in place of the network device, process load for the network device is reduced. However, in a network system in which both a network device and a proxy server respond to a search packet, both the network device and the proxy server may transmit response packets to respond to a multicast search packet. This can not reduce the network congestion.

DISCLOSURE OF INVENTION

According to the present invention, a network device transmits its information to a proxy server. When the proxy server is in a state where proxy-send of the information is possible, the network device restricts response to a search request by multicast (a response may also, be completely inhibited). The states where proxy-send is possible include not only a state where proxy-send is actually possible but also a state where proxy-send will be possible in the future. For example, the states where proxy-send is possible include a state where a restriction instruction has been received from the proxy server.

According to the present invention, if a proxy server can proxy-send information of a network device, the network device restricts transmission of a response. Therefore, it is possible to mitigate increase of traffic due to both the proxy server and the network device transmitting response packets in response to a search request by multicast.

Further features of the present invention will become apparent from the following description of exemplary embodiments (with reference to the attached drawings).

BEST MODE FOR CARRYING OUT THE INVENTION

Embodiments which are helpful in understanding higher, middle and lower conception of the present invention will be described below. Of course, the particular embodiments described below are for purpose of illustration only.

First Embodiment

Figure 1:
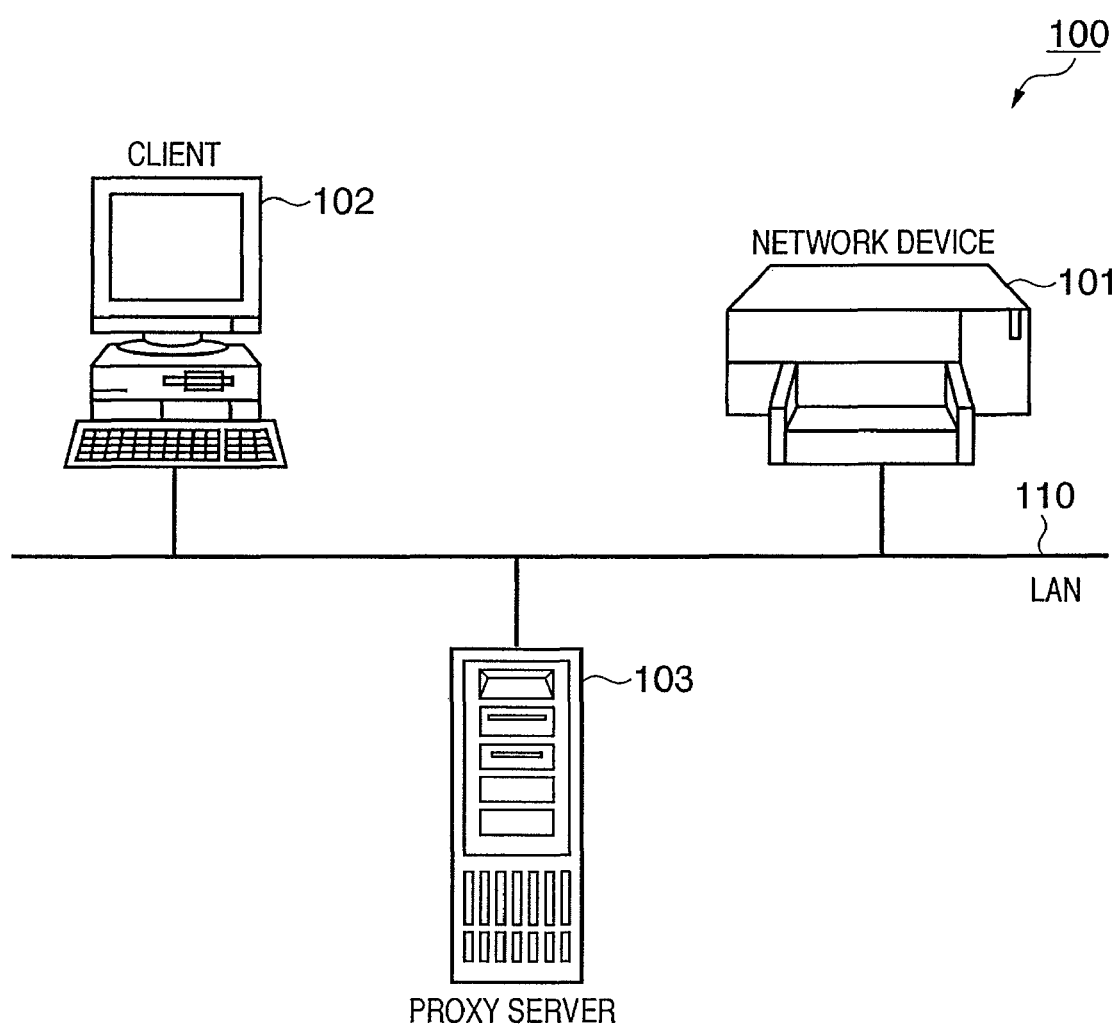
FIG. 1 is an example of a network device according to an present embodiment.

FIG. 1 is an example of a network device according to the present embodiment. The network system 100 mainly includes one or more network devices 101 connected via LAN 110, one or more clients 102, and one or more proxy servers 103.

The network devices 101 are peripheral devices having a network card (NIC) (such as a printer, copying machine, scanner or digital camera). The client apparatus (hereinafter client) 102 are information processing apparatus such as PC (Personal Computer). The proxy servers 103 are information processing apparatus for caching setting information included in a response packet transmitted from the network devices 101 and for transmitting the cached setting information to the clients 102. The setting information is information required for the client to communicate with the network device. For example, it is the IP address of the network device, the printer port, information about driver software for the network device and the like.

According to the present embodiment, first, the network device 101 registers setting information with the proxy server 103. The proxy server 103 stores the setting information in a storage apparatus and becomes in a state where proxy-send of the setting information is possible. Thereafter, the network device 101 restricts response to a search request transmitted from a client or a search request by multicast (a response may also be completely inhibited). The states where proxy-send of the setting information is possible also include a state where the network device 101 has received a restriction instruction from the proxy server 103, because the restriction instruction implies that proxy-send will be possible in the future.

Figure 2:
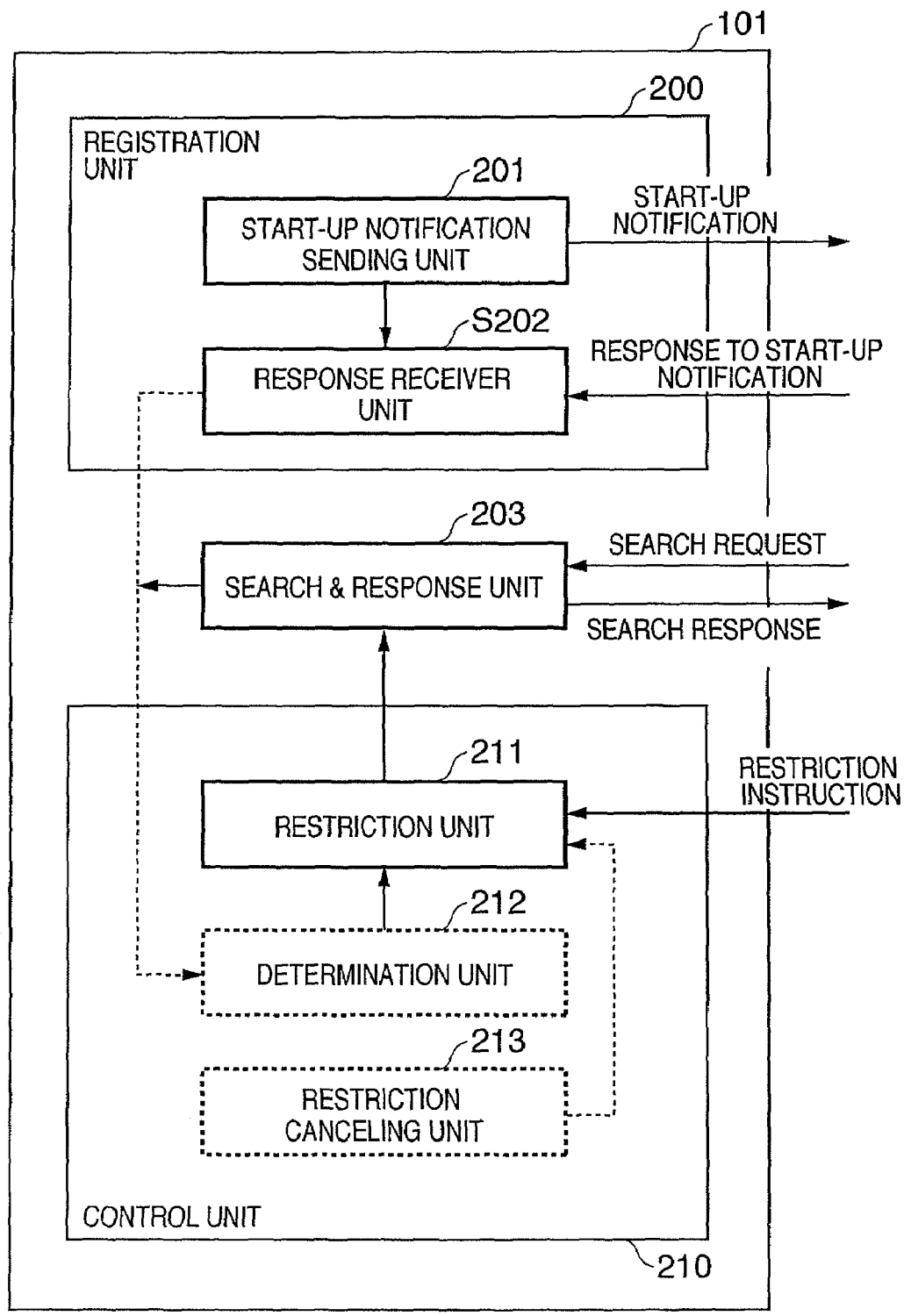
FIG. 2 is an exemplary block diagram of a network device according to the embodiment.

FIG. 2 is an exemplary block diagram of a network device according to an embodiment. Each part described below may be implemented in software only, a combination of software and hardware, or hardware only.

A registration unit 200 is a unit for registering setting information with the proxy server 103. The setting information is, for example, information required for the client 102 to communicate with the network device 101 and the like. For example, it is the IP address of the network device, the printer port, information about driver software for the network device and the like. The registration unit 200 may include, for example, a start-up notification sending unit 201. The start-up notification sending unit 201 is a unit for transmitting a start-up notification to the proxy server 103 when an agent service is invoked at the network device 101. The registration unit 200 may also include a response receiver unit 202. The response receiver unit 202 is a unit for receiving a response transmitted from the proxy server 103 that has received the start-up notification. The response may include, for example, information for restricting (e.g., disabling) response operation to a search request transmitted from the client 102 or a search request by multicast.

A search response unit 203 is a unit for transmitting a response to the search request transmitted from the proxy server 103 or the client 102. A control unit 210 controls response operation of the search response unit 203.

The control unit 210 is a unit for restricting response to a search request transmitted from the client 102 or a search request by multicast when the proxy server 103 is in a state where proxy-send of the setting information is possible. The control unit 210 includes, for example, a restriction unit 211 for restricting response to a search request. For example, having received restriction instruction of response from the proxy server 103, the restriction unit 211 initiates restriction on response. The restriction unit 211 may control the search response unit 203 such that it responds to a search request from the proxy server 103 or a search request by unicast or broadcast.

The control unit 210 may include a determination unit 212, a restriction canceling unit 213 and the like. Dotted lines in FIG. 2 show that the determination unit 212 and the restriction canceling unit 213 are option. The determination unit 212 determines whether or not the proxy server 103 is in a state where proxy-send of setting information about the network device 101 is possible. For example, having received a search request by unicast transmitted from the proxy server 103, the search response unit 203 transmits a search response including the setting information. Next, the determination unit 212 can determine that proxy-send is possible if transmission of the search response by the search response unit 203 is executed. If transmission of the search response has not completed or the like, the determination unit 212 determines that proxy-send is not possible. However, even if the transmission of the search response has not completed, if it is likely that proxy-send will be possible in the future, the determination unit 212 may determine that proxy-send is possible.

For example, when the proxy server 103 is in no-response state, the restriction canceling unit 213 cancels restriction on response to a search request from the client 102 or the like. States where the proxy server 103 is in no-response include, for example, where the proxy server 103 completes normally or abnormally. In this way, when the proxy server 103 is in no-response, the network driver 101 automatically switches to respond to a search request from the client 102 or the like. Therefore, unexpected situation where the network device 101 can not be detected from the client 102 will be avoided.

Figure 3A:
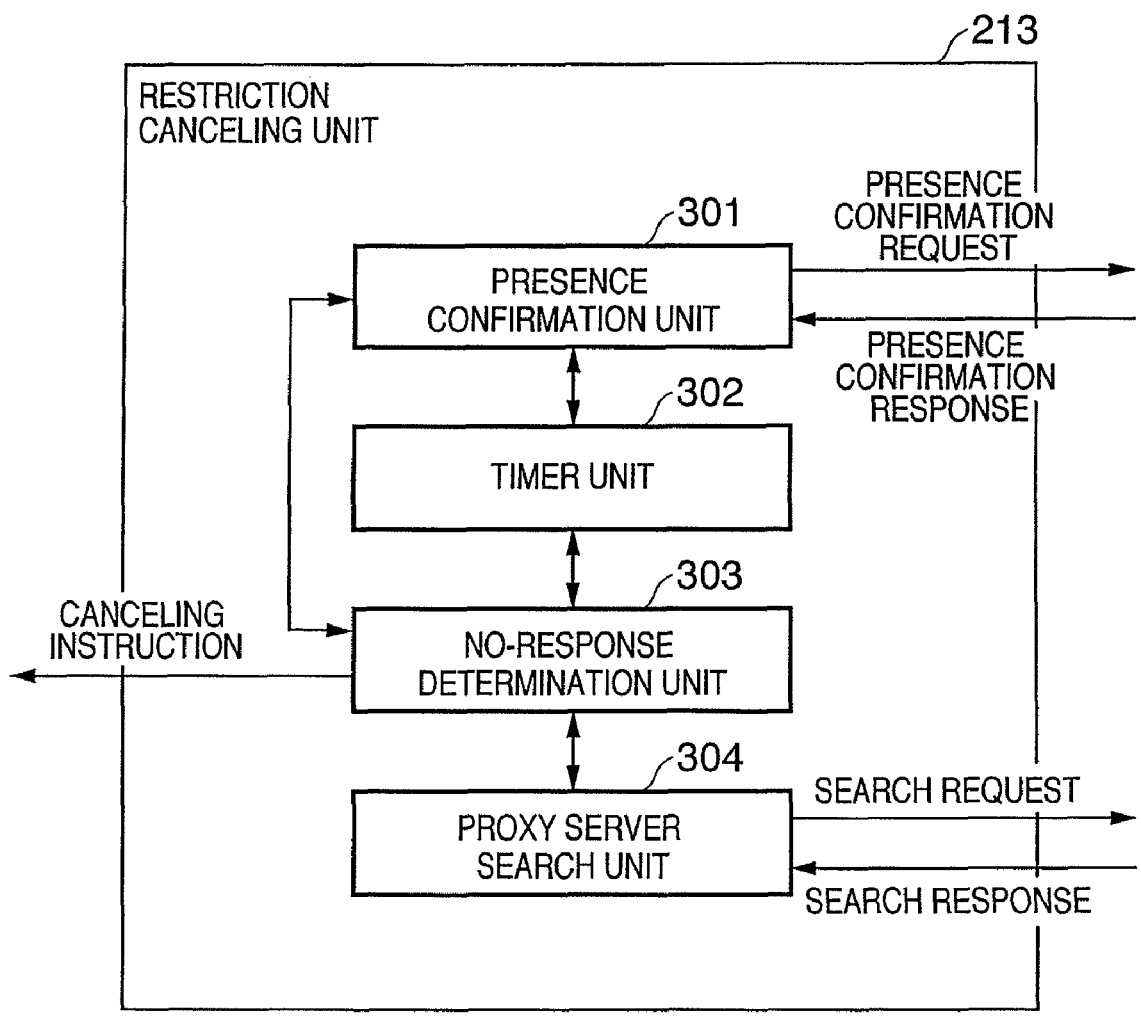
FIG. 3A is an exemplary configuration of a restriction canceling unit according to the embodiment.

FIG. 3A is an exemplary configuration of the restriction canceling unit according to an embodiment. The restriction canceling unit 213 comprises a presence confirmation unit 301 for confirming the presence of the proxy server 103. The presence confirmation unit 301 transmits a presence confirmation request to the proxy server 103. The presence confirmation request is a request for querying the presence of the proxy server 103. As long as the presence of the proxy server 103 can be confirmed, any form and content of the presence confirmed request might be used. If the proxy server 103 is operating normally, the proxy server 103' transmits a presence confirmation response with respect to the presence confirmation request. Therefore, if the presence confirmation unit 301 receives the presence confirmation response, it can determine that the proxy server 103 is present. The presence confirmation unit 301 may also transmit the presence confirmation request when the presence confirmation request is received from another device (e.g., the client 102).

A timer unit 302 is a timer unit for measuring elapsed time since the presence confirmation request (inquiry of presence) has been transmitted. For example, when the elapsed time measured by the timer unit 302 reaches a predetermined time, a no-response determination unit 303 determines that the proxy server 103 is in no-response state. If so, the no-response determination unit 303 transmits a restriction canceling instruction to the restriction unit 211. As a result, since the restriction unit 211 cancels the restriction, the search response unit 203 transmits a response to a search request from the client 102 or a search request by multicast.

In this way, since the network device 101 confirms the presence of the proxy server as necessary, packets transmitted for the presence confirmation will be minimized.

The proxy server search unit 304 is a unit for searching other proxy servers or the like when the current proxy server 103 is in no-response state. This enables the network device 101 to register its own setting information with other proxy servers.

Figure 3B:
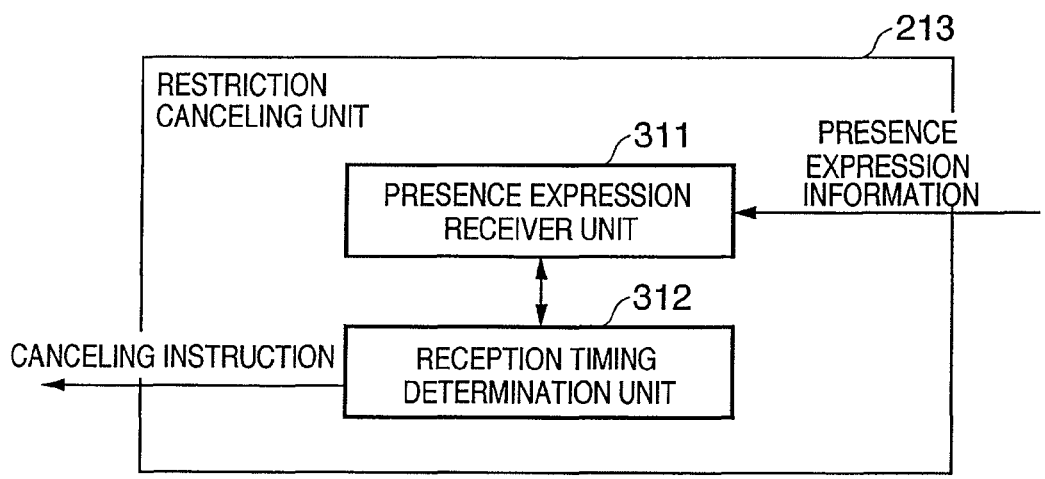
FIG. 3B is another exemplary configuration of the restriction canceling unit according to the embodiment.

FIG. 3B is another exemplary configuration of the restriction canceling unit according to an embodiment. A presence expression receiver unit 311 receives presence expression information (e.g., a keep-alive packet) which is explicitly transmitted from the proxy server 103 when it is operating normally. A reception timing determination unit 312 determines whether or not the presence expression information is being received at predetermined timing. For example, the predetermined timing is periodic timing or the like. If the presence expression information can not be received at the predetermined timing, the reception timing determination unit 312 determines that the proxy server is in no-response state and outputs the canceling instruction.

In this way, the network device 101 can recognize that the proxy server 103 is in no-response when the presence expression information to be transmitted at the determined timing is not received. Since the network device 101 does not required to transmit the presence confirmation request (FIG. 3A), process load may be reduced.

Figure 3C:
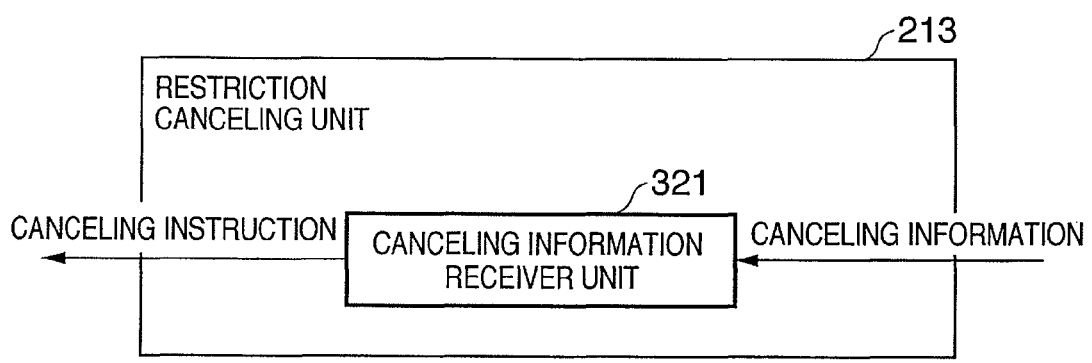
FIG. 3C is another exemplary configuration of the restriction canceling unit according to the embodiment.

FIG. 3C is another exemplary configuration of the restriction canceling unit according to an embodiment. A canceling information receiver unit 321 is a unit for receiving canceling information to cancel restriction. For example, the canceling information may be halt information transmitted before the proxy server 103 halts. Having received the canceling information, the canceling information receiver unit 321 outputs canceling instruction.

In this way, if the proxy server 103 halts, the network device is notified of the halt information in advance, so that it will be prevented that network device 101 can not be searched.

Alternatively, the canceling information receiver unit 321 may outputs the canceling instruction if it receives the canceling information and the proxy server search unit 304 can not detect another proxy server. That is, if another proxy server is present, the network device 101 can request the proxy server for proxy response. Of course, the effect of traffic reduction is also provided.

Figure 4:
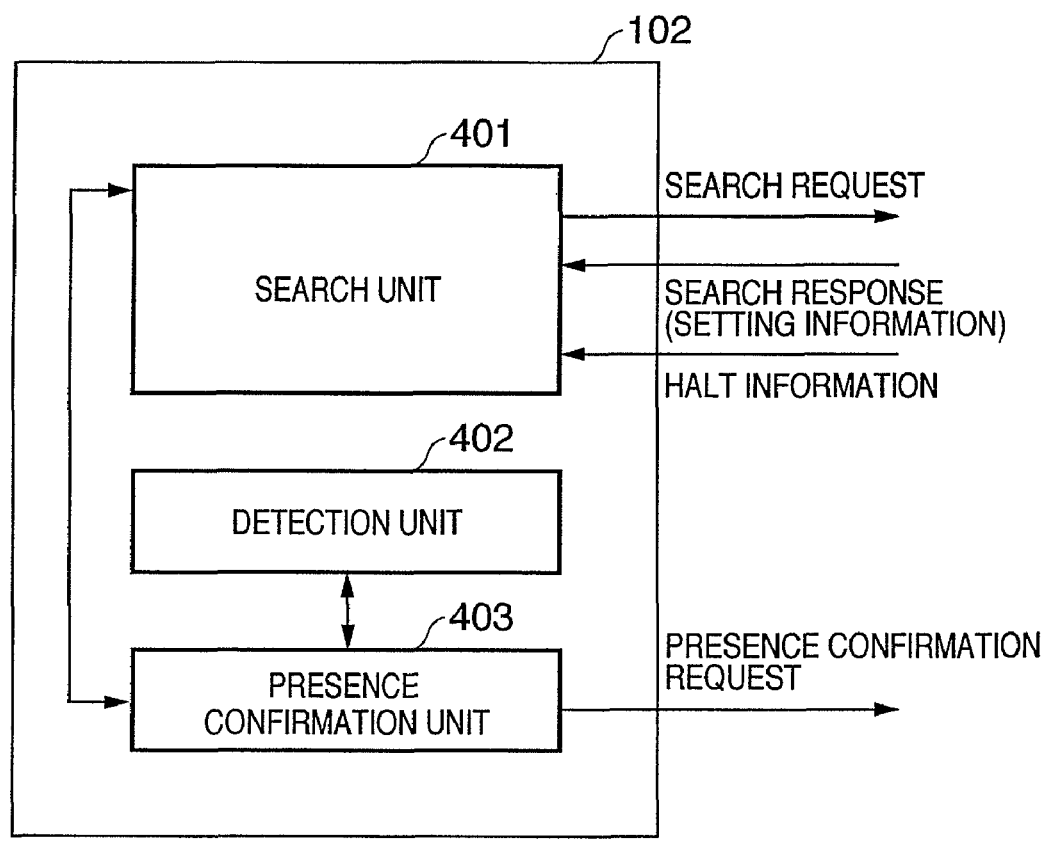
FIG. 4 is an exemplary block diagram of a client apparatus according to the embodiment.

FIG. 4 is an exemplary block diagram of a client according to an embodiment. A search unit 401 is a unit for transmitting a search request by multicast and receiving a search response (including setting information) to the search request. Also, the search unit 401 may transmit a search request by unicast to the proxy server 103, and if a response to the search request can not be provided from the proxy server 103, then the search unit 401 may transmit a search request by multicast, since transmitting a search by unicast before a search by unicast enables traffic increase to be mitigated.

A detection unit 402 is a unit for detecting a predetermined opportunity for transmitting a presence confirmation request to the network device 101. Having detected the predetermined transmission trigger, the presence confirmation unit 403 transmits a presence confirmation request for requesting the network device 101 to confirm the presence of the proxy server 103. For example, the transmission trigger is when there is no response from the proxy server 103 or the like.

Figure 5:
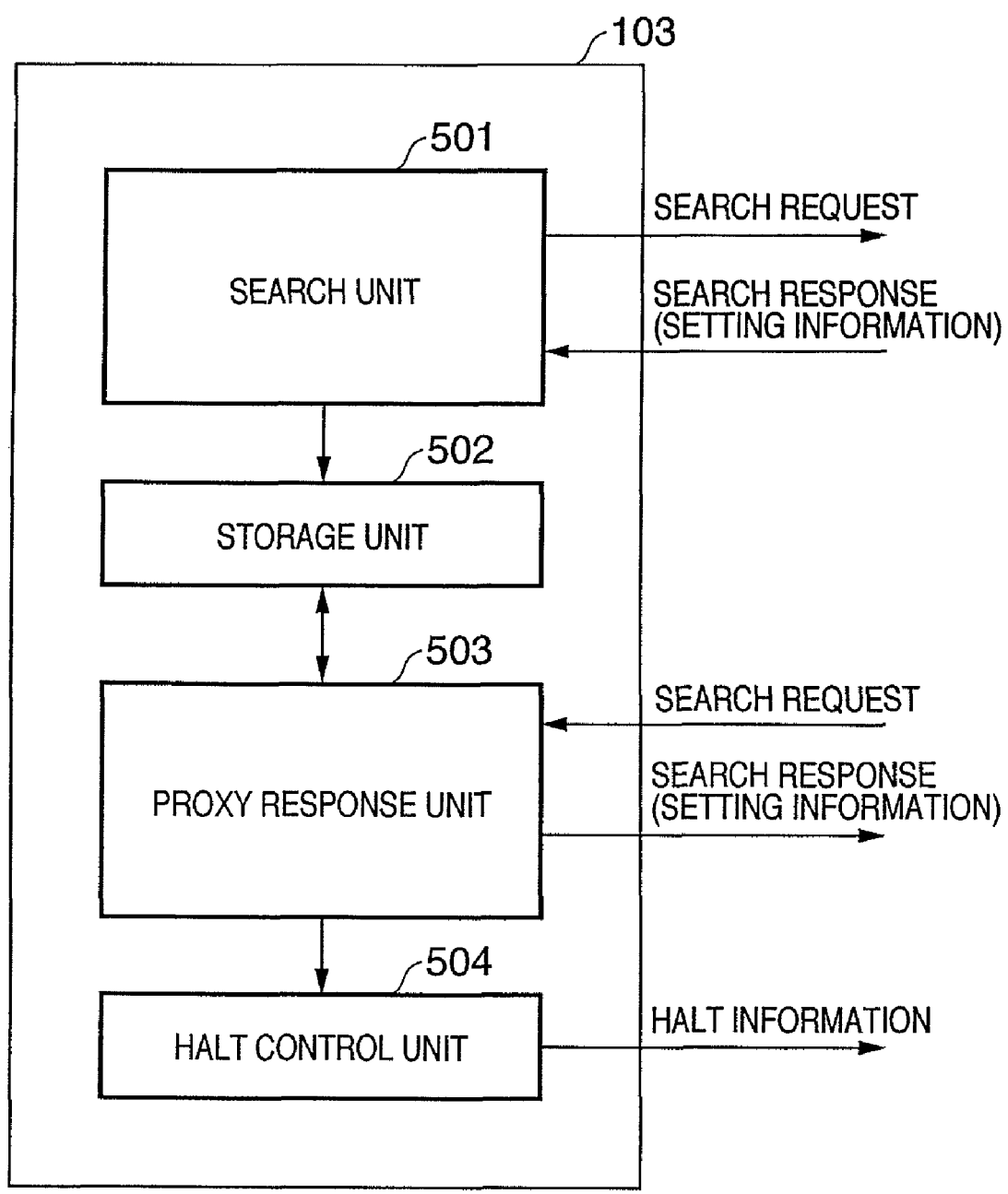
FIG. 5 is an exemplary functional block diagram of a proxy server according to the embodiment.

FIG. 5 is an exemplary functional block diagram of a proxy server according to an embodiment. The search unit 501 is a unit for transmitting a search request by multicast and receiving a search response (including setting information) to the search request. The search unit 501 may also be configured to transmit a search request by unicast or broadcast. When receiving a start-up notification from the network device 101, the search unit 501 transmits a response to the start-up notification to the network device 101.

The storage unit 502 is a unit for storing setting information of the network device 101 that is received via the search unit 501. A proxy response unit 503 is a unit for reading setting information from the storage unit, creating and transmitting a search response when receiving a search request by multicast. A halt control unit 504 is a unit for transmitting halt information before the proxy sever 103 halts.

Figure 6:
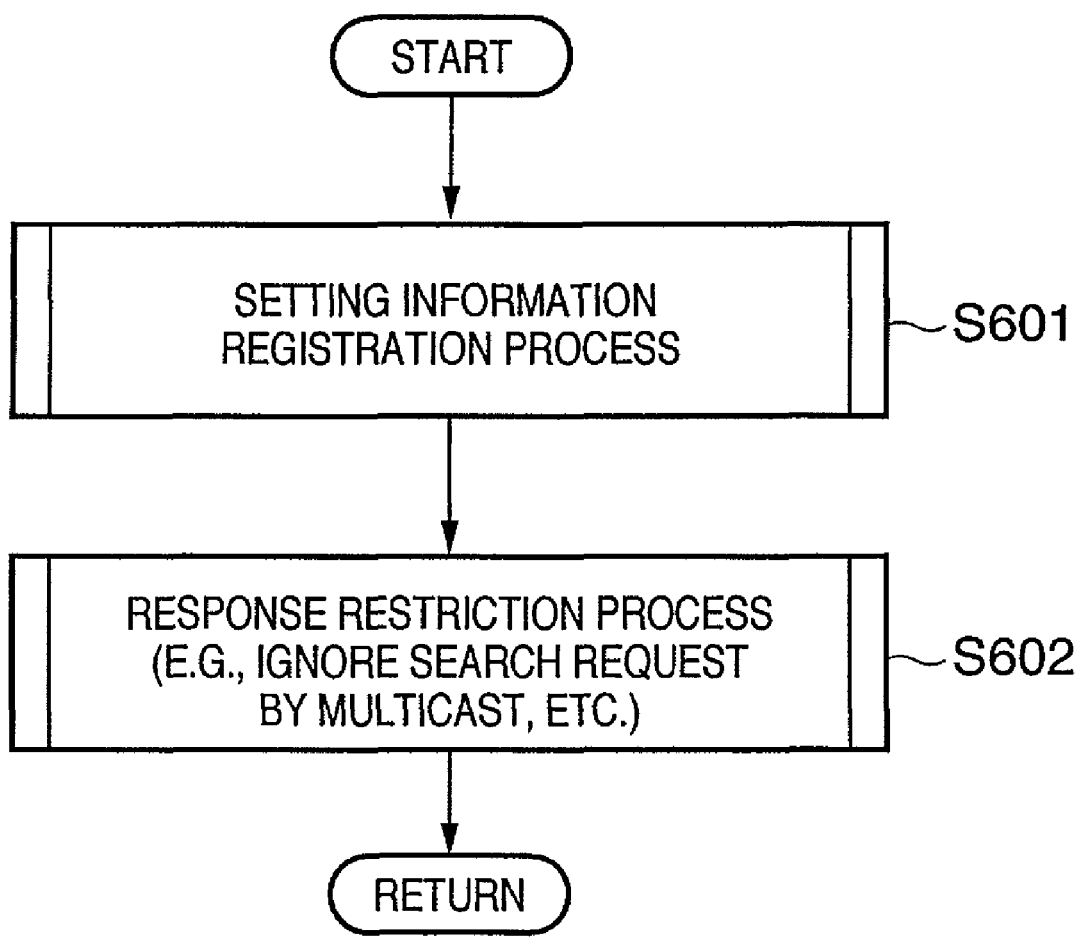
FIG. 6 is an exemplary flow chart showing a method of controlling the network device according to the embodiment.

FIG. 6 is an exemplary flow chart showing a method of controlling the network device according to an embodiment. The most basic flow of the above-described search processes will be described below.

At step S601, the registration unit 200 registers setting information of the network device 101 with the proxy server 103. At step S602, when the proxy server 103 is in a state where proxy response is possible, the control unit 210 restricts response operation to a search request by multicast or a search request transmitted from a client. As a result, the search response unit 203 operates to ignore these search requests even when they are received.

As described above, according to the presence present embodiment, when the network 101 is in a state where proxy response is possible, it ignores a search request from the client 102 or a search request by multicast. This can prevents a situation where both the client 102 and the proxy server 103 respond to a search request. Further, traffic increase involved with responses will be mitigated.

A restriction instruction for restricting a response operation to a search request from the client 102 or a search request by multicast may also be added to a search protocol. That is, if the proxy sever 103 transmits a explicit restriction instruction, the process determining whether or not the proxy server 103 is in the state where proxy response is possible will not be required in the network device 101. The explicit restriction instruction will be preferable since the response operation can be more reliably restricted.

Of course, the network device 101 responds to a search request from the proxy server 103 and a search request by unicast, since the effect to traffic is relatively small even if it responds to these search requests. Also, if it ignores a response from the proxy server 103, it may be that proxy response by the proxy server 103 can not be provided.

A start-up notification when the network device 101 is invoked may cause the proxy server 103 to transmit a restriction instruction. This has an advantage that traffic increase can be mitigated from start-up. That is, in response to receiving a response to the start-up notification from the proxy server 103, the network device 101 may restrict response operation to a search request by multicast or a search request transmitted from a client, since the presence of the proxy server 103 can be confirmed by receiving the response to the start-up notification from the proxy server 103.

Alternatively, when completing a response to a search request transmitted from the proxy server 103, the network device 101 may determine that the proxy server 103 is in the state where proxy response is possible. That is, when completing the response, setting information is cached in the proxy server 103, so that the proxy response is possible.

When the proxy server 103 is in no-response, the proxy response function may have halted. Therefore, when the proxy server 103 is in no-response, it is desirable that the network device 101 again activates the restricted response operation. If the response operation remains restricted, the client 102 can not search for the network device 101.

The presence confirmation process may also be performed to confirm that the proxy sever 103 is present (is normally operating). Alternatively, the presence confirmation proxy may be performed based on presence expression information transmitted from the proxy sever 103 at a predetermined timing. If the presence of the proxy sever 103 can not be confirmed, the proxy server 103 may have halted or run away, therefore it is desirable that the network device 101 cancels the restriction on the response operation.

The proxy server 103 may also transmit canceling information before it halts. This enables the network device 101 to activate the response operation immediately.

The network device 101 may also search for other proxy servers 103 when activating the response operation. If another proxy server 103 is present, proxy response can be requested to the proxy server 103. Of course, using a proxy server increases the effect of traffic reduction.

It is desirable that client 102 transmits a search request by unicast to the proxy server 103, since a search request by multicast relatively increases traffic. However, if a response is not provided from the proxy server 103, a search request by multicast may be transmitted. This enables the client 102 to appropriately search for the network device 101 even when the proxy server 103 can not respond. The client 102 may also cause the network device 101 to confirm the presence of the proxy server 103 according to a predetermined transmission trigger.

Second Embodiment

A second embodiment will be described below as a lower conception of the invention described in the first embodiment. The present embodiment is the case where the present invention is applied to UPnP. Of course, the present invention is not limited to UPnP, but may be similarly applied to other search protocols.

For simplicity, the parts common to the first embodiment are labeled as the same reference numerals.

Figure 7:
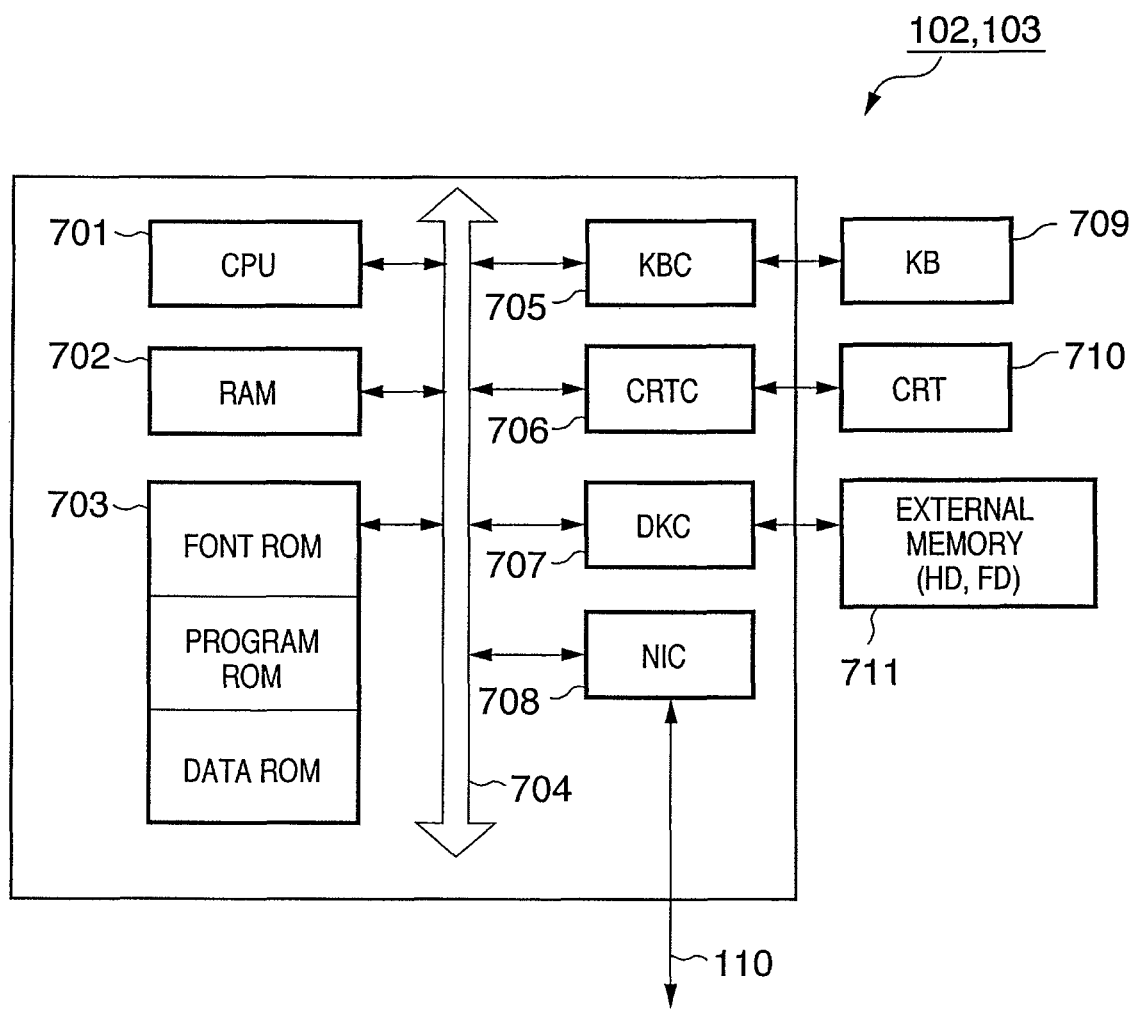
FIG. 7 is an exemplary block diagram of a client apparatus and a proxy server according to an embodiment.

FIG. 7 is an exemplary block diagram of a client and a proxy server according to an embodiment. Here, both the client and the proxy server are described as general PCs for simplicity. For further simplicity, it is assumed that a client program and a proxy server program are executed on the same PC. Of course, the client program and the proxy server program are actually executed on different PCs. The network device executing the client program or the applicable program is also referred to as a search agent.

An example of the hardware configuration of the client 102 and the proxy server 103 are following. CPU 801 is a control unit for controlling each part of the apparatus in a centralized manner. RAM 702 is a volatile storage unit serving as a work area. ROM 703 is a non-volatile storage unit for storing font data, program, and various data. Reference numeral 704 is an internal bus. The keyboard controller (KBC) 705 is a control, unit for controlling a keyboard 709, pointing device and the like. A CRT controller (CRTC) 706 is a control unit for controlling a CRT display (CRT) 710. The disk controller (DKC) 707 is a control unit for controlling an external memory 711. The external memory 711 is a flexible disk drive, hard disk drive or the like. The network card 708 is a communication unit for connecting with LAN 110, such as an Ethernet® card.

The ROM 703 or the external memory 711 stores computer programs such as the client program, operating system (OS), and printer driver software.

Figure 8:
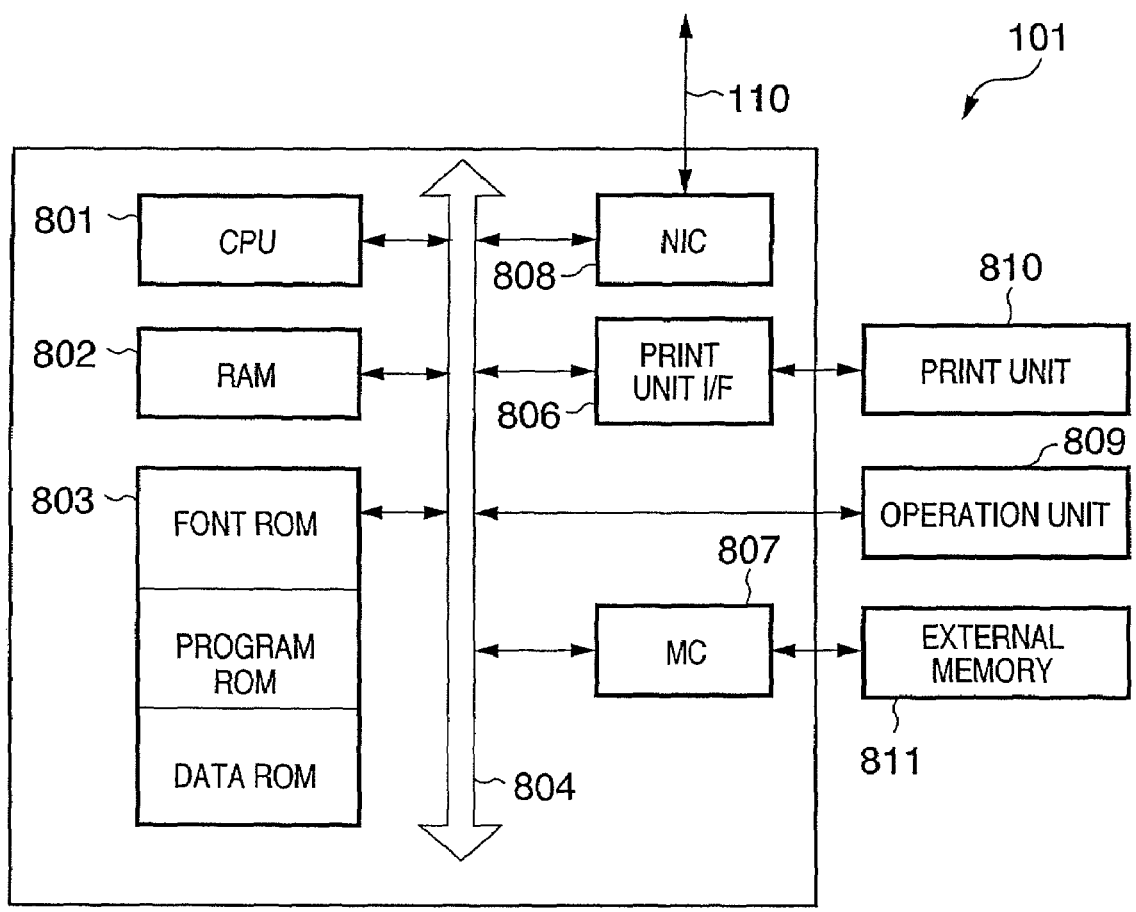
FIG. 8 is an exemplary functional block diagram of a network device according to the embodiment.

FIG. 8 is an exemplary functional block diagram of a network device according to an embodiment. In this example, it is assumed that the network device 101 is a printer. Of course, the present invention applies to any other peripheral devices.

CPU 801 is a control unit for controlling each part of the apparatus in a centralized manner. RAM 802 is a volatile storage unit serving as a work area. ROM 803 is a non-volatile storage unit for storing font data, program, and various data. Reference numeral 804 denotes an internal bus. A print unit interface 806 is a control unit for controlling a print unit 810. The print unit 810 is an image forming unit such as a laser printer engine or inkjet printer engine. A memory controller (MC) 807 is a control unit for controlling an external memory 811. The external memory 811 is a flexible disk drive, hard disk drive or the like. For example, the external memory 811 stores font data, an emulation program, form data and the like. The network card 808 is a communication unit for connecting with LAN 110, such as an Ethernet® card or wireless LAN card.

Figure 9:
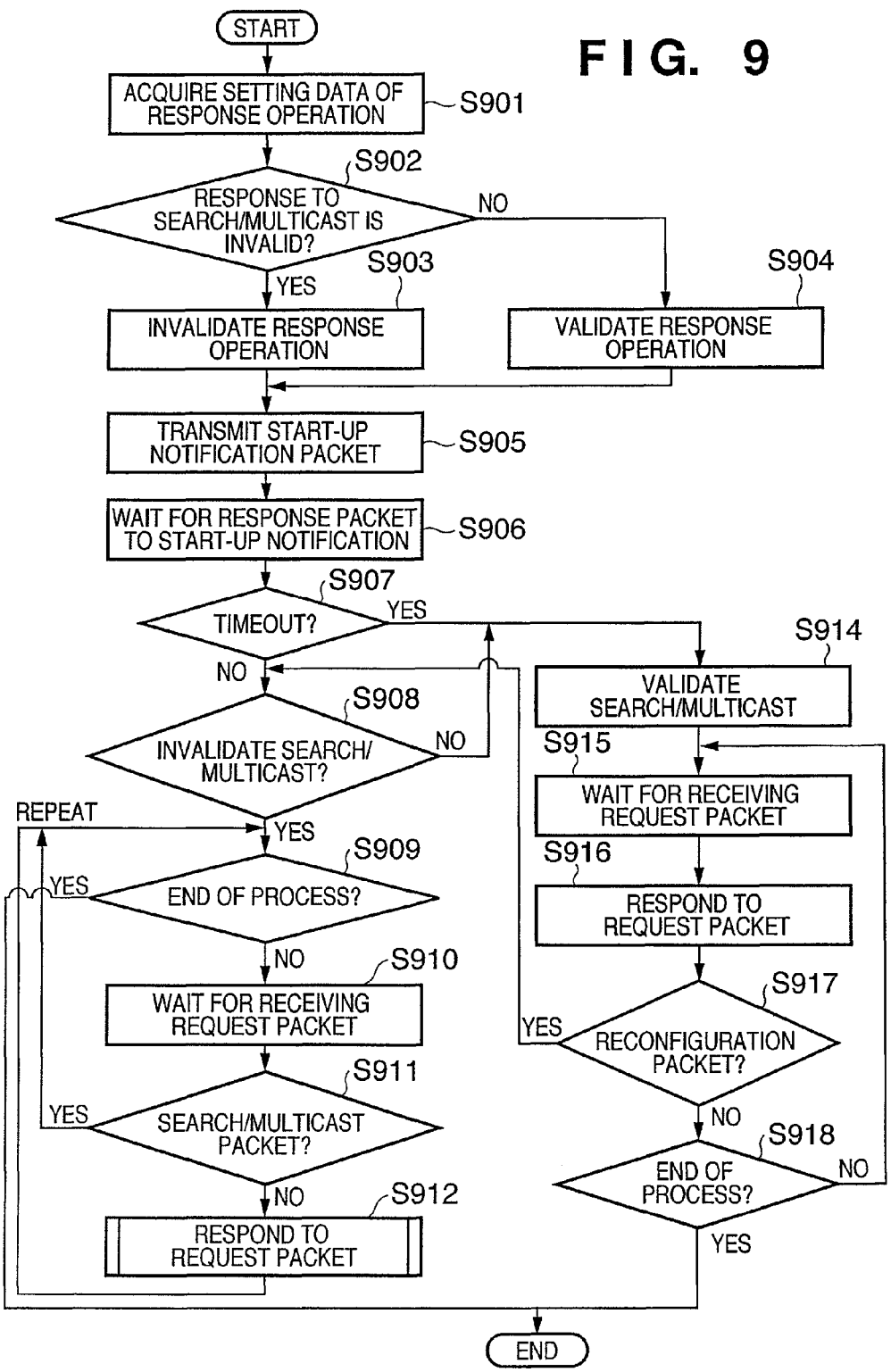
FIG. 9 is an exemplary flow chart of a search response process according to the embodiment.

FIG. 9 is an exemplary flow chart of a search response process according to an embodiment. The response process (agent service) is intended to be executed on the network device (e.g., printer) 101. A computer program for executing the response process is intended to be stored in the ROM 803 or the external memory 811.

At step S901, when the agent program is invoked, the CPU 801 acquires a setting data prescribing a default response operation (response mode). The agent program is software providing an agent service. For example, the default setting data is intended to be stored in the ROM 803 or the like. The setting data includes information for determining a response operation when receiving a search request. For example, the response operations include multicast and non-multicast modes. If the response operation is set to the multicast mode, the CPU 801 also responds to a request packet by multicast (search/multicast packet). Of course, the CPU 801 also responds to request packets by unicast and broadcast. The request packet by multicast means a search request packet to which a multicast address is set as the destination. The request packet by unicast means a search request packet to which unicast address is set as the destination. The request packet by broadcast means a search request packet to which broadcast address is set as the destination.

On the other hand, if the response operation is set to the non-multicast mode, the CPU 801 responds only to request packets by unicast and broadcast. That is, in the non-multicast mode, the CPU 801 restricts response to a request packet by multicast.

At step S902, the CPU 801 determines whether or not it should respond to a request by multicast based-on the acquired setting data. If the setting data indicates that it should invalidate response operation to a request packet by multicast (in case of the multicast mode), the process proceeds to step S903.

At step S903, the CPU 801 invalidates response operation to a request packet by multicast. For example, the CPU 801 sets a valid/invalid flag stored in the RAM 802 to 1 (invalid).

On the other hand, if response operation is valid (in case of the multicast mode), the process proceeds to step S904. At step S904, the CPU 801 validates response operation to a request packet by multicast. For example, the CPU 801 sets the valid/invalid flag stored in the RAM 802 to 0 (valid).

At step S905, the CPU 801 transmits a start-up notification packet via the network card 808 to the client 102, the proxy server 103, other search agents and the like. The start-up notification packet is a packet for indicating that the agent program is invoked.

At step S906, the CPU 801 waits until a response packet to the start-up notification is received from the proxy server 103. At this point, the CPU 801 starts time measurement using an internal timer. Having received the start-up notification packet, the proxy server 103 transmits the response packet by unicast to the network device 101.

At step S907, the CPU 801 determines whether or not timer timeout occurs. That is, when waiting periods exceeds a predetermined period, "timeout" occurs. If timeout does not occur, the process proceeds to step S908. If timeout occurs, the process proceeds to step S914.

At step S908, the CPU 801 determines whether or not the received response packet is a setting packet for invalidating response operation of the search service. If it is the packet for invalidation, the process proceeds to step S909. If it is the packet for validation, the process proceeds to step S914.

At step S909, the CPU 801 determines whether or not internal status of the agent service is a status meaning the end (hereinafter end status). For example, if the received response packet is an end instruction packet, the end status occurs. If the end status occurs, the CPU 801 shut down the agent service according to the present flow chart.

On the other hand, if the end status does not occur, the CPU 801 attempts to receive a request packet at step S910.

At step S911, if the received request packet is a request packet by multicast, the CPU 801 ignores it and the process proceeds to step S909. This appropriately restricts response operation.

On the other hand, if the received request packet is not a request packet by multicast, or it is a request, packet by unicast or broadcast, the process proceeds to step S912.

At step S912, the CPU 801 creates a response packet to the received request packet and transmits it via the network card 808.

If timeout occurs at step S907, or if a packet indicating an explicit validation at step S908, the process proceeds to step S914. That is, even if the start-up notification packet is transmitted, the proxy server 103 is not present on the network if the response packet can not be received. In this case, as is conventional, it is required to respond to a request packet by multicast.

At step S914, the CPU 801 changes response operation of the agent program to the multicast mode. That is, it validates response operation to a request packet by multicast.

At step S915, the CPU 801 waits for receiving a request packet. At step S916, the CPU 801 creates a response packet to the received request packet and transmits it.

At step S917, the CPU 801 determines whether or not the received packet is a packet indicating reconfiguration of the response operation (hereinafter reconfiguration packet). If it is the reconfiguration packet, the process returns to step S908. On the other hand, it is determined at step S918 whether or not the end status occurs. If the end status occurs, the CPU 801 shut down the agent service according to the present flow chart. On the other hand, the end status does not occur, the process returns to step S915, and the CPU 801 attempts to receive a request packet.

Figure 10:
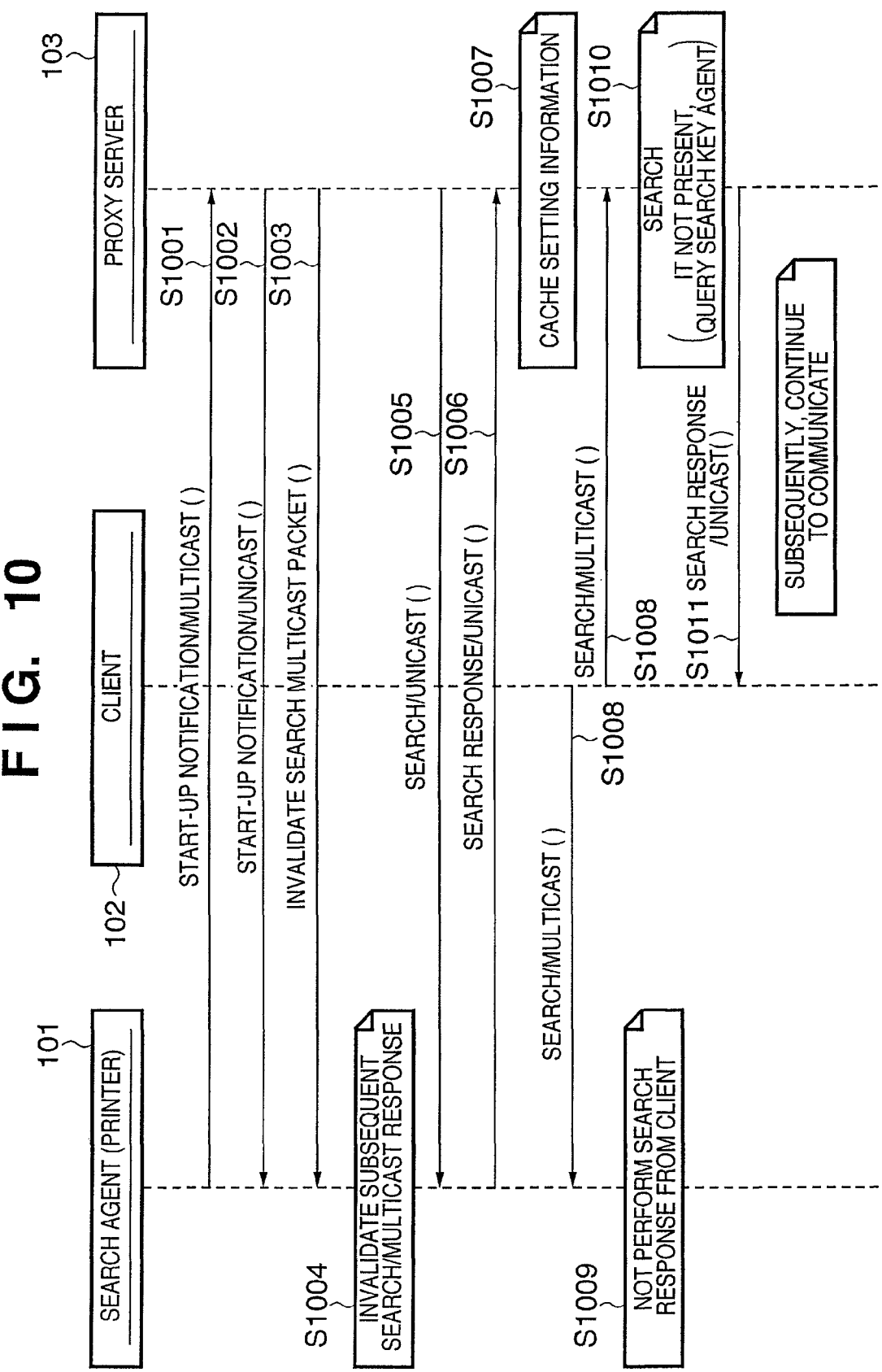
FIG. 10 is an exemplary sequence diagram of a search protocol according to the embodiment.

FIG. 10 is an exemplary sequence diagram of a search protocol according to an embodiment. First, at S1001, the network device 101 operating as a search agent transmits (by multicast) a start-up notification packet (S905). The proxy server 103 and the CPU 701 in the client 102 receive the start-up notification via the network card 708. At S1002, the CPU 701 in the proxy server 103 transmits (by unicast) to the network device a response packet to the start-up notification.

Further, at S1003, the CPU 701 in the proxy server 103 transmits to the network device 101 an instruction packet for invalidating response operation to a request packet by multicast. At S1004, this causes the network device 101 to move to the non-multicast mode (S906 to S912).

Further, at S1005, the CPU 701 in the proxy server 103 transmits a request packet by unicast to the network device 101. The network device 101 creates and returns a response packet (unicast) including setting information for registering with the proxy server 103 (S910 to 912).

At S1006, the CPU 701 in the proxy server 103 receives a response packet (unicast). At S1007, the CPU 701 in the proxy server 103 stores the setting information included in the received response packet in the external memory 711.

Thereafter, at S1008, the CPU 701 in the client 102 transmits a request packet by multicast via the network card 708. At S1009, the network device 101 ignores the packet because the response operation is invalidated (S911, Yes).

At S1010, the CPU 701 in the proxy server 103 searches for setting information stored in the external memory 711. If setting information matching a search condition included in the request packet is included, the CPU, 701 reads the setting information and transmits a response packet. On the other hand, if the setting information is not found, the CPU 701 transmits a request packet (unicast) to the network device 101 which is subject to the search. Having received the packet, the network device 101 creates and returns a response packet (unicast) including setting information for registering with the proxy server 103 (S910 to S912). The proxy-server 103 stores the setting information in the external memory 711. Thereafter, at S1011, the CPU 701 in the proxy server 103 creates a search response packet, sets the client address in the response packet and transmits it by unicast. The CPU 701 in the client 102 receives the setting information of the network device 101 and executes configuration process to communicate with the network device 101.

As described above, according to the present embodiment of the invention, when proxy response of the proxy server 103 is possible, the network device 101 restricts response operation to a request packet by multicast. Therefore, it can be prevented that both the network device 101 and the proxy server 103 respond to the packet. Traffic of search protocols will also be reduced. Other effects have been described in the first embodiment and are not described here.

Third Embodiment

The proxy server 103 may halt for the various reasons. If the proxy server halt during the network device is operating in the non-multicast mode, it may be that the client 102 can not search the network device 101 semipermanently.

In the present embodiment, the invention is described in which if the proxy server 103 halts, the network device 101 is notified of the halt and moves to the multicast mode.

Figure 11:
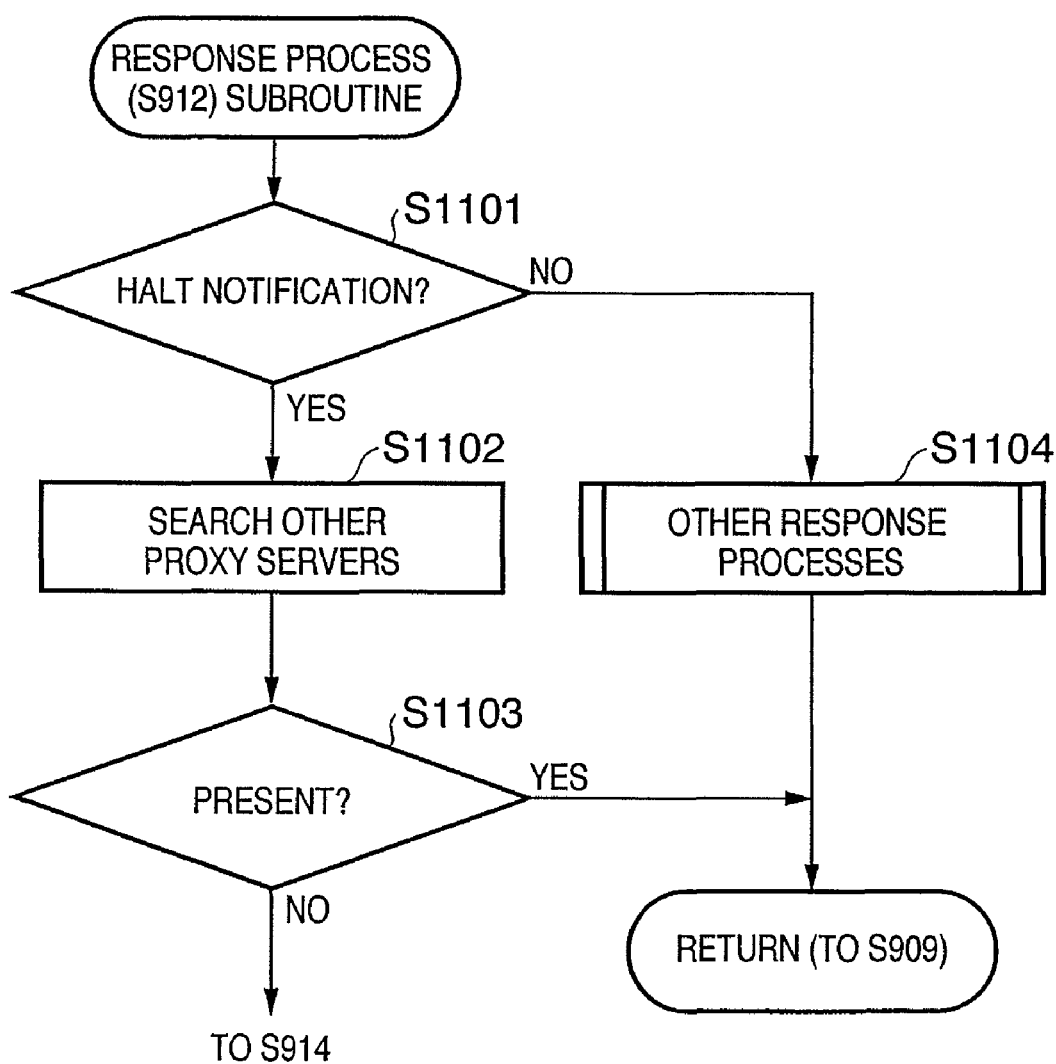
FIG. 11 is an exemplary flow chart of a search response process taking into account normal halt of a proxy server according to an embodiment.

FIG. 11 is an exemplary flow chart of a search response process taking into account halt of a proxy server according to an embodiment. The process according to the present flow chart is a subroutine version of step S912 in FIG. 9. Therefore, the parts which have been already described are labeled as the same reference numerals for simplicity.

At step S1101, the CPU 801 in the network device 101 determines whether or not the received packet is a halt notification packet meaning that the proxy server 103 halts. If it is the halt notification packet, the process proceeds to step S1102, where the CPU 801 searches other proxy servers. For example, the CPU 801 searches other proxy servers using a search protocol such as SLP (Service Location Protocol) standardized in RFC 2165 or WS-Discovery proposed by the applicants of the present application. Of course, other search protocols may be used.

At step S1103, the CPU 801 determines whether or not another proxy service is present. If another proxy server is not present, the process proceeds to step S914, where the CPU 801 moves to the multicast mode. This enables the CPU 801 to respond to a request packet by multicast transmitted from the client 102.

If another proxy server is present, the process proceeds to step S909, where the CPU 801 waits for a request packet from the proxy server. If setting information is not registered with the found proxy server, the CPU 801 registers the setting information with the proxy server.

On the other hand, if it is determined that the received packet is not the halt notification packet at step S1101, the process proceeds to step S1104, where the CPU 801 executes a response process depending on the type of the received packet.

As described above, according to the present embodiment of the invention, in addition to the effect of the first embodiment, the problem involved with halt of a proxy server can be solved. That is, transmitting the halt notification packet from the proxy server 103 enables the network device 101 to return to the multicast mode. That is, this enables the client 102 to search for the network device 101.

If another proxy search is present, the network device 101 may continue to operate in the non-multicast mode, since traffic increase involved with search processes may remains to be reduced.

Fourth Embodiment

The description of the third embodiment assumes that the proxy server 103 halts or ends normally. However, in an actual environment, the proxy server 103 may end abnormally. In case of abnormal end, the proxy server 103 is likely to be incapable of transmitting a halt notification. Therefore, in the third embodiment, problem occurs when the proxy server 103 ends abnormally. That is, the client 102 can not search for the network device 101 operating in the non-multicast mode. In addition to the case of abnormal end, for example, when the connection between the proxy server 103 and the LAN 110 is disconnected, similar problem occurs.

In the present embodiment, a function for confirming the presence of the proxy server is added to the agent program. Of course, if the presence of the proxy server can not be confirmed, the network device returns to the multicast mode. It may also returns to the multicast mode when non-multicast mode canceling information is received from the client 102 or the like.

Figure 12:
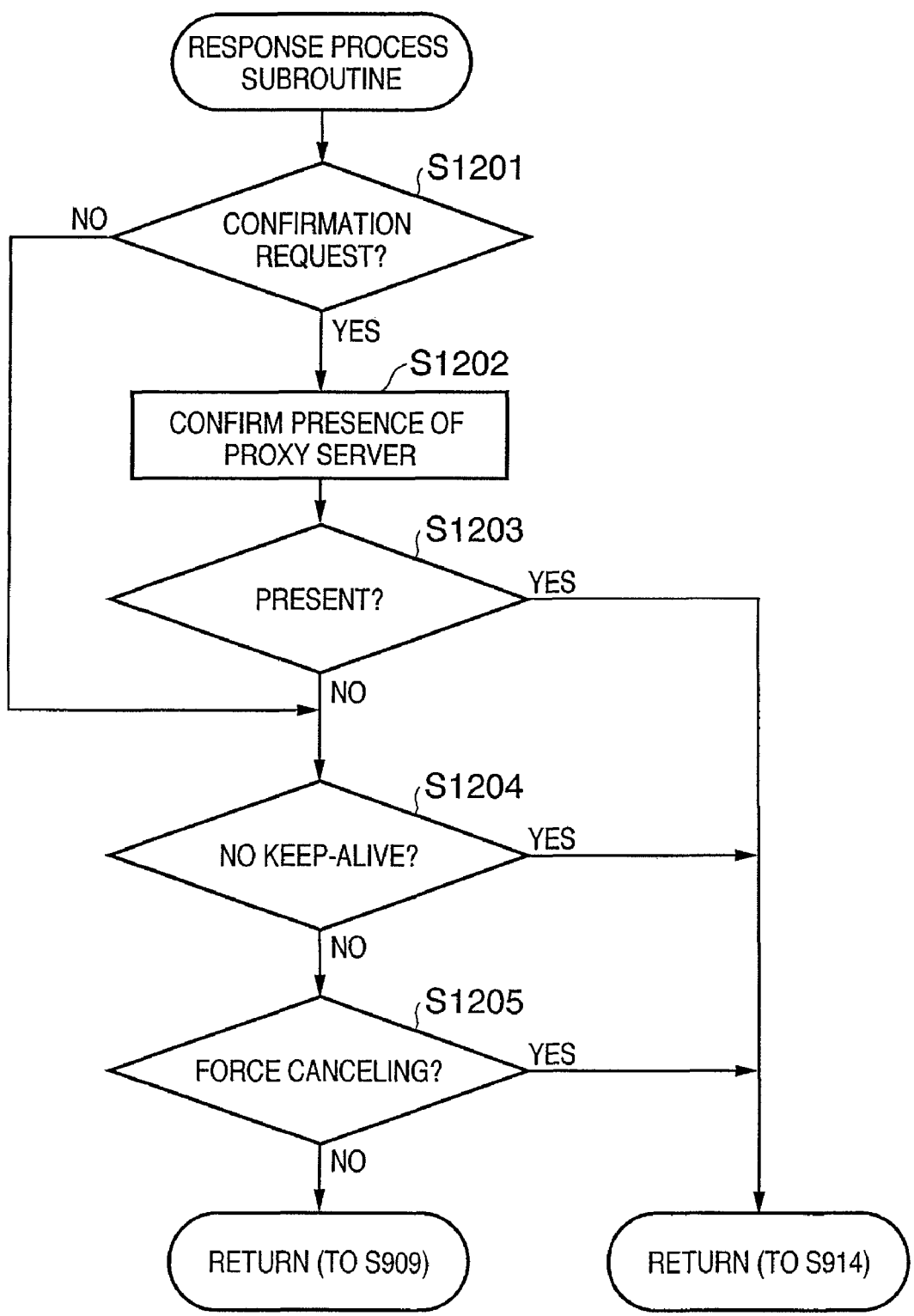
FIG. 12 is an exemplary flow chart of a search response process taking into account abnormal halt of a proxy server according to an embodiment.

FIG. 12 is an exemplary flow chart of a search response process taking into account abnormal halt of a proxy server according to an embodiment. The process according to the present flow chart is a subroutine corresponding to S912 in FIG. 9 or S1104 in FIG. 11. Therefore, the parts which have been already described are labeled as the same reference numerals for simplicity. The present embodiment may be combined with not only the second embodiment but also the third embodiment.

At step S1201, the CPU 801 in a network device determines whether or not the received packet is a packet requesting to confirm the presence of the proxy server 103. For example, the presence confirmation request packet is transmitted from the client 102 or the like. If it is not the presence confirmation request packet, the process proceeds to step S1204. If it is the presence confirmation request packet, the process proceeds to step S1202.

At step S1202, the CPU 801 executes the presence confirmation of the proxy server 103. For example, the CPU 801 creates a request packet (inquiry of presence) for searching for the network device 101 itself and transmits it to the proxy server 103. Having received the request packet, the CPU 701 in the proxy server 103 returns a response packet.

At step S1203, the CPU 801 determines whether or not the response from the proxy server 103 has been received within a predetermined period. If there is no response, the proxy server 103 is not present and the process, proceeds to step S914. That is, the CPU 801 returns to the multicast mode. On the other hand, if there is a response, the process proceeds to step S1204.

At step S1204, the CPU 801 determines whether or not the received packet is a presence expression (keep-alive) packet that is to be periodically transmitted from the proxy server 103. If the presence expression packets are not received at periodic timing, the process proceeds to step S914. That is, the CPU 801 returns to the multicast mode. On the other hand, if the presence expression packets are received at periodic timing, the process proceeds to step S1205. The CPU 701 in the proxy server 103 is intended to detect the periodic timing using an internal timer and to transmit the presence expression packet to the network device 101.

At step S1205, the CPU 801 determines whether or not the received packet is an instruction packet (force canceling packet) for force canceling the non-multicast mode. This packet may be regarded as a packet for validating response operation to a request packet by multicast. If the received packet is the force canceling packet, the process proceeds to step S914. If the received packet is not the force canceling packet, the CPU 801 executes a response process depending on the type of the received packet and the process returns to step S909.

As described above, according to the present embodiment of the invention, if the proxy server 103 halts abnormally or the like, the network device 101 returns to the multicast mode. Therefore the problem that the network device 101 can not searched will be solved.

In FIG. 12, the present subroutine may include at least one of S1201 to S1203 and S1204, since the present subroutine including at least one of them can detect emergency halt of the proxy server 103. In case of performing S1201 to S1203, it is assumed that the CPU 801 in the client 102, other proxy servers or the like can transmit a presence confirmation request to the network device 101.

Other Embodiments

Although various embodiments have been described above, the present invention may also apply to a system comprising a plurality of devices. The present invention may also apply to an apparatus comprised of a single device. For example, the apparatus is a scanner, printer, PC, copying machine, multi-function peripheral, facsimile machine or the like. That is, the present invention may apply to any apparatus having a function for connecting a network.

Of course, the present invention is not limited to LAN but may also apply to other networks such as WAN and wireless LAN.

The present invention is also provided by directly or remotely supplying a software program providing the functions of the above-described embodiments to a system or apparatus and reading and executing the supplied program by a computer included in the system or the like.

Therefore, program code itself installed in the computer to implement the functions and processes of the present invention in a computer also provides the present invention. That is, the computer program itself to provide the above functions and processes is also an aspect of the present invention.

In this case, the computer program may be any form of program such as object code, programs executed by an interpreter and script data that is supplied to OS, as long as it has the function of the program.

Recording media for supplying the program include, for example, a flexible disk, hard disk, optical disk, magneto-optical disk, MO, CD-ROM, CD-R, CD-RW and the like. The recording media also include a magnetic tape, non-volatile memory card, ROM, DVD (DVD-ROM, DVD-R) and the like.

The program may be downloaded from a home page in the Internet using a browser in the client computer. That is, the computer program itself of the present invention or a compressed file including automatic installation function may be downloaded to a recording medium such as a hard disk. It may also be possible to divide the program code constituting the program according to the present invention into a plurality of files and to download these files from different home pages. That is, the constituent features of the present invention may include a WWW server allowing a plurality of users to download program files to implement the functions and processes of the present invention in a computer.

Further, it may be possible to encrypt the program according to the present invention, store it in a storage medium such as CD-ROM and distribute to a user. In this case, it may be possible to permit users who satisfy a predetermined condition to download key information for decryption, decrypt and execute the encrypted program using the key information and install the program into a computer.

The functions of the embodiments described above may also be provided by a computer executing the read program. OS or the like running on the computer may perform some or all of the actual processes. Of course, the functions of the embodiments may be provided in this case.

Further, a program read from the recording medium may be written in a memory provided on a function expansion board inserted in the computer or a function expansion unit connected to the computer. Based on the instructions of the program, CPU or the like provided on the function expansion board or function expansion unit may perform some or all of the actual processes. In this way, the functions of the embodiments described above may be provided.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2005-294031 filed on Oct. 6, 2005, which is hereby incorporated by reference herein in its entirety.

The invention claimed is:

1. A network device for communicating with a client apparatus and a proxy server connected via a network, the network device comprising:
    at least one processor and a memory;
    a first receiving unit which receives an instruction from said proxy server for restricting a response to a search request sent from said client apparatus;
    a transmission unit which transmits information of said network device to said proxy server for said proxy server to respond to the search request sent from said client apparatus as a substitution for said network device;
    a control unit which restricts response to a search request if said network device receives the search request by multicast after said first receiving unit receives the instruction from said proxy server, and responds to a search request if said network device receives the search request by unicast after said first receiving unit receives the instruction from said proxy server;
    a second receiving unit which receives canceling information for canceling the restriction on response to said search request; and
    a cancel unit which cancels the restriction on response to said search request when said canceling information is received,
    wherein said canceling information is halt information transmitted before said proxy server halts.

2. The network device according to claim 1, wherein the first receiving unit further receives, from the proxy server, other information indicating that said proxy server can send the information of said network device, and wherein the other information includes the instruction which restricts a response operation.

3. The network device according to claim 1, wherein said control unit performs controlling to respond to a search request transmitted from said proxy server.

4. The network device according to claim 1, further comprising:
    a transmitting unit which transmits to said proxy server a start-up notification representing that said network device is invoked; and
    a third receiving unit which receives a response to said start-up notification from said proxy server,
    wherein said control unit restricts response to a search request transmitted by multicast from said client apparatus in response to receiving said response to said start-up notification.

5. The network device according to claim 1, further comprising:
    a response unit which responds to a search request transmitted from said proxy server,
    wherein said control unit restricts response to a search request by multicast from said client apparatus in response to receiving, from the proxy server, other information indicating that said proxy server can send the information of said network device after said response unit has responded to the search request transmitted from said proxy server.

6. The network device according to claim 1, wherein said control unit further comprises:
    a second cancel unit which cancels the restriction on response to said search request when said proxy server is in a no response state.

7. The network device according to claim 6, wherein said cancel unit comprises:
    a transmitting unit which transmits an inquiry of presence to said proxy, server;
    a measure unit which measures elapsed time since said inquiry of presence has been transmitted; and
    a determining unit which determines that said proxy server is in the no response state when said elapsed time reaches a predetermined time.

8. The network device according to claim 6, wherein said second cancel unit comprises:
    a third receiving unit which receives presence expression information from the proxy server transmitted at a predetermined timing; and
    a determining unit which determines that said proxy server is in the no response state when said presence expression information is not received at said predetermined timing.

9. The network device according to claim 1, wherein said cancel unit cancels the restriction on response to said search request if it receives said canceling information and cannot communicate with other proxy servers.

10. The network device according to claim 1, wherein said control unit performs controlling to respond to a search request transmitted from said client apparatus.

11. The network device according to claim 1, wherein said information transmitted from said transmission unit is information related to an IP address of said network device, a printer port, and/or information about driver software for said network device.

12. A client apparatus for communicating with the network device according to claim 1, the client apparatus comprising:
    a detecting unit which detects a predetermined transmission trigger; and
    a transmitting unit which transmits a confirmation instruction requesting said network device to confirm the presence of said proxy server.

13. A client apparatus for communicating with the network device according to claim 1, the client apparatus comprising:
   a first transmitting unit which transmits a search request by unicast to said proxy server; and
   a second transmitting unit which transmits a search request by multicast to said proxy server if a response to said search request transmitted by said first transmitting unit is acquired from said proxy server.

14. A client apparatus for communicating with the network device according to claim 1, the client apparatus comprising:
   a receiving unit which receives halt information from said proxy server; and
   a transmitting unit which transmits a search request by multicast when said halt information is received.

15. A method of controlling a network device for communicating with a client apparatus and a proxy server connected via a network, comprising;
   at least one processor of the network device performing the steps of:
   receiving an instruction from said proxy server for restricting a response to a search request sent from said client apparatus;
   transmitting information of said network device to said proxy server for said proxy server to respond to the search request sent from said client apparatus as a substitution for said network device;
   controlling to restrict a response to a search request if the search request is received by the network device by multicast after said receiving step receives the instruction from said proxy server, and controlling to respond to a search request if said network device receives the search request by unicast after said receiving step receives the instruction from said proxy server;
   receiving canceling information for canceling the restriction on response to said search request; and
   canceling the restriction on response to said search request when said canceling information is received,
   wherein said canceling information is halt information transmitted before said proxy server halts.

16. A non-transitory computer-readable storage medium on which is stored a computer program, said computer program executed on a network device for communicating with a client apparatus or a proxy server connected via a network, the program when executed by a processor of the network device causing the network device to perform the steps of:
   receiving an instruction from said proxy server for restricting a response to a search request sent from said client apparatus;
   transmitting information of said network device to said proxy server for said proxy server to respond to the search request sent from said client apparatus as a substitution for said network device;
   controlling to restrict a response to a search request if said network device receives the search request by multicast after said receiving step receives the instruction from said proxy server, and controlling to respond to a search request if the network device receives the search request by unicast after said receiving step receives the instruction from said proxy server;
   receiving canceling information for canceling the restriction on response to said search request; and
   canceling the restriction on response to said search request when said canceling information is received,
   wherein said canceling information is halt information transmitted before said proxy server halts.

* * * * *